Nov. 9, 1965    J. R. OISHEI    3,216,753
WINDSHIELD WIPER LINKAGE
Filed March 5, 1962    2 Sheets-Sheet 1
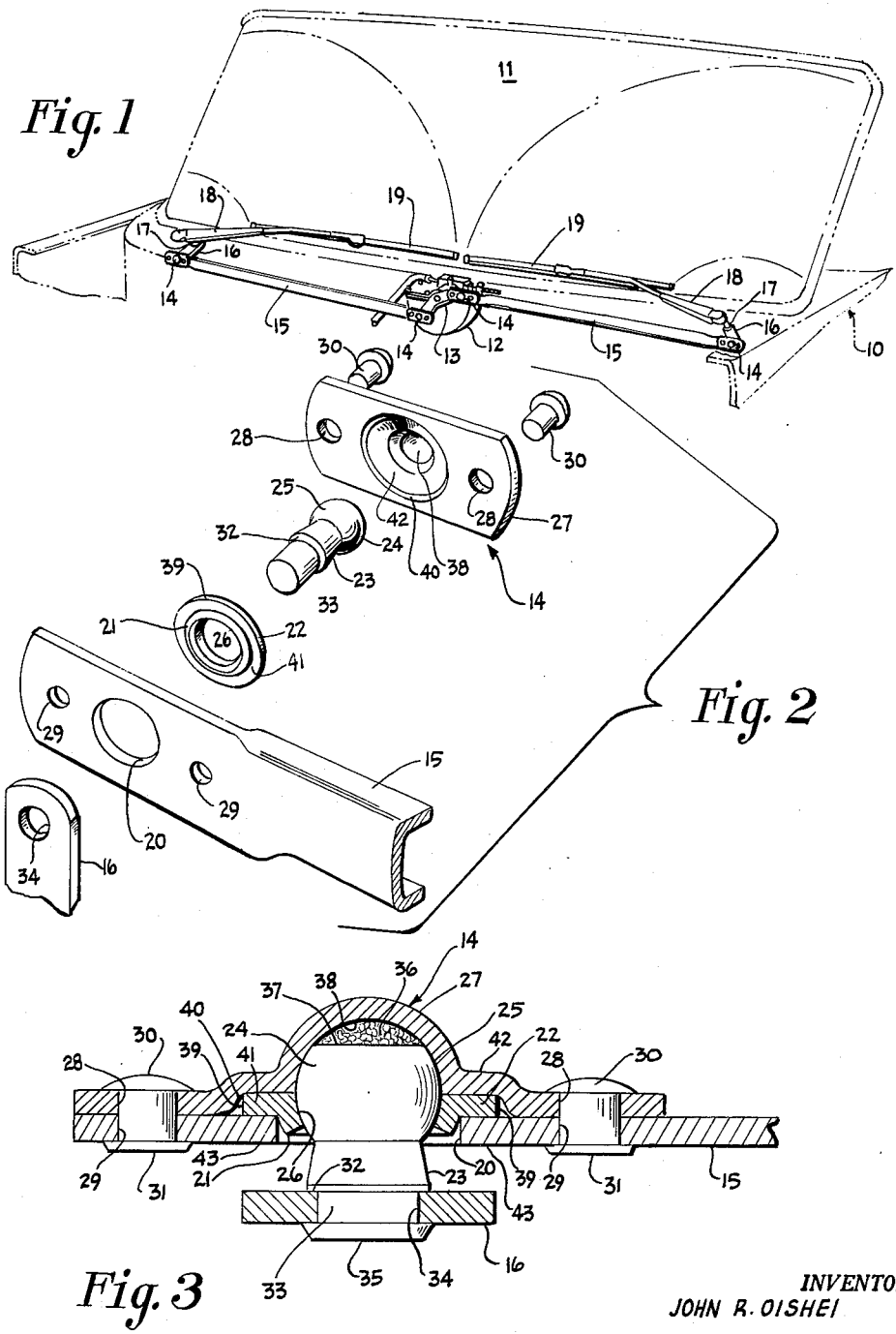
INVENTOR.
JOHN R. OISHEI
BY
Bean Brooks Buckley & Bean.
ATTORNEYS Nov. 9, 1965  J. R. OISHEI  3,216,753
WINDSHIELD WIPER LINKAGE
Filed March 5, 1962  2 Sheets-Sheet 2

INVENTOR.
JOHN R. OISHEI
BY
Bean Brooks Buckley & Bean.
ATTORNEYS

United States Patent Office 3,216,753
Patented Nov. 9, 1965

3,216,753
WINDSHIELD WIPER LINKAGE
John R. Oishei, Buffalo, N.Y., assignor to Trico Products Corporation, Buffalo, N.Y.
Filed Mar. 5, 1962, Ser. No. 177,481
4 Claims. (Cl. 287—87)

The present invention relates to an improved windshield wiper linkage for an automotive vehicle, said linkage including a ball and socket joint which is capable of providing both self-lubrication and automatic wear compensation thereby providing smooth silent operation.

In windshield wiper linkage installations, ball and socket joints are used for coupling link elements which move relative to each other. Since these windshield wiper linkages are usually located underneath the cowl of a vehicle, they are relatively inaccessible for service and, therefore, an installation should be designed to give long life usage without service or last the life of the vehicle. Furthermore, since the linkages generally operate in a resonant chamber which is behind the vehicle dashboard, it is imperative that the linkages operate quietly and smoothly so that they do not generate noise which can be magnified by the resonant chamber to the annoyance and distraction of occupants of the vehicle. Notwithstanding that the joints of the linkages must be tight to minimize noise, it is desirable that they provide relatively little friction so as to impose a relatively low load on the wiper motor.

It is accordingly the primary object of the present invention to provide a windshield wiper linkage having an improved ball and socket joint which is capable of providing smooth silent long life operation without the requirement for service in the way of lubrication. A related object of the present invention is to provide an improved ball and socket joint of unique construction wherein the ball element is a composite member which includes a lubricating member which may be biased into contact with the socket in which it is located thereby providing an arrangement which is self-compensating for tightness, this self-compensating feature obviating the tendency for the ball joint to become loose with use and thus create noise.

The improved linkage, which includes the low-friction, smooth-operating, noiseless, wear-compensating ball and socket joint of the present invention, is located between the wiper motor and the rockshaft which mounts the wiper arm. The ball and socket joint, which is located between adjacent link elements, is subjected to abruptly changing direction of forces during wiper operation. A preferred embodiment of the present invention consists of a sectioned ball stud mounted for unitized friction-lessened operating relationship with respect to a sectioned socket. The ball stud is rigidly secured to one link element with the sectioned ball thereof mounted for relative movement within a socket carried by an adjacent link element. The sectioned ball stud includes a first ball portion which is cut-away, the spherical surface of said first ball portion being in engagement with a lubricant bearing of complementary concave spherical configuration which is pressed into a perforation in one of said link elements. A matching ball insert portion, which carries lubricant, has a surface which matches the cut-away surface of the first ball portion and rests thereon. The ball insert portion has a convex spherical surface which is received in a cap plate having a complementary concave spherical surface and which is rigidly secured to the same link element carrying the above noted bearing. Optionally, a spring element may be located between the first portion of the ball and the insert portion and tends to expand said portions into firm mating engagement with the bearing and cap plate, respectively. The spring causes the sections of the ball to expand to thereby take up any play, this, in turn, obviating any tendency for noisy operation. However, it is to be especially noted that the wear of the ball and socket joint is minimal because of its self-lubricating characteristic, noted above, and because of the low unit pressure between the ball and its socket. Thus the foregoing embodiment of the present invention provides relatively low-friction operation and a minimum of play because the sectioned ball joint expands to always maintain the outer surfaces of the ball in firm engagement with the surfaces of the socket, thereby providing smooth silent operation.

In accordance with another embodiment of the present invention, the spring which is located between the sections of the ball is eliminated. This can be done because the amount of wear between the sectioned ball element and the sectioned socket is maintained at a minimum due to the above noted self-lubricating feature.

In accordance with an extremely simplified embodiment of the present invention, the above mentioned matching insert is eliminated entirely. In this embodiment, a quantity of grease is inserted in the chamber otherwise occupied by said matching ball insert portion to provide a source of lubrication for the bearing insert which is mounted on one of the link elements and which forms a portion of the socket for the ball.

In all of the foregoing embodiments of the present invention, there is a unique relationship between the various portions of the ball and socket joint which is conducive to ease of fabrication and to the permanency of the installation. More specifically, the porous bronze bearing socket element, which is fabricated by a sintering operation, has an external shoulder which is press fitted into mating engagement with a perforation in one of the link elements. After the ball portion of the ball stud is located in the concave spherical surface of the foregoing bearing, the above mentioned cap plate, having a partial spherical socket of substantially the same radius as the ball portion, is mounted over the ball portion. The assembling of the socket element, ball stud, and cap plate in the foregoing manner aligns the cap plate with respect to the link, which, in turn, causes apertures in said cap plate and said link to become aligned for the purpose of receiving rivets for maintaining the above elements in assembled relationship. In order to further stabilize the bearing element in its assembled position, the cap plate sandwiches laterally extending portions of said bearing element between it and the link element, and, in addition, the cap plate has deformed portions which receive peripheral portions of the bearing element to provide further support. Thus, in all embodiments of the improved ball and socket joint, there are three structurally interlocking relationships which tend to stabilize the assembly, namely, the interference fit between the bearing element and the link, the interengaging relationship between the cap plate and the bearing element, and the sandwiching relationship between the link element, bearing element, and cap plate. The stabilization of the ball and socket joint in the foregoing manner prevents any tendency of the ball and socket joint to shift relative to the link element on which it is mounted during operation, thereby also obviating the tendency toward looseness which results in noise and wear.

All of the foregoing aspects of the present invention will be more fully understood when the following portions of the specification are read in conjunction with the accompanying drawings wherein:

FIG. 1 is a fragmentary perspective view of an automotive vehicle mounting a wiper linkage set including the improved self-lubricating ball and socket joint of the present invention;

FIG. 2 is an exploded perspective view of one embodiment of the present invention;

FIG. 3 is a cross sectional view of the embodiment of FIG. 2;

Figure 5:
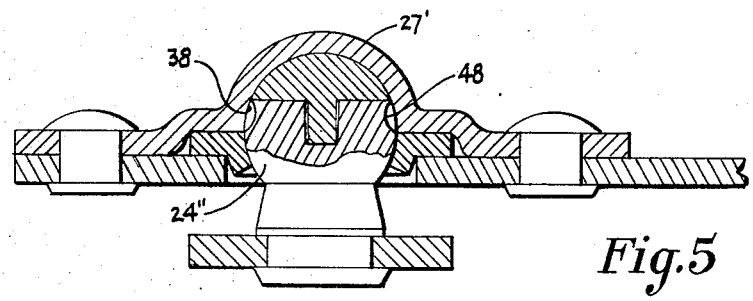
FIG. 5 is another embodiment of the present invention similar to the embodiment of FIG. 3, but having a portion of the ball element cut away to lessen friction.

Reference is now made to FIG. 1 wherein an automotive vehicle 10 is shown having a windshield 11 mounted thereon in the conventional manner. A wiper motor 12 is suitably mounted on the wall of a chamber underneath the cowl of the vehicle and has a drive lever 13 rigidly affixed to the output shaft thereof. While the wiper motor shown is of the vacuum type, it will be understood that it can also be of the electric or hydraulic type. Connected to the drive lever 13 by ball and socket joints 14 are the first ends of elongated torque-transmitting driving link elements 15. The opposite ends of link elements 15 are coupled to wiper pivot shaft driving levers, or link elements, 16 by ball and socket joints 14. Wiper pivot shaft driving link elements 16 are secured to first ends of rockshafts 17 which are suitably journalled for rotation in bearings in the cowl of the vehicle and have wiper arms 18 mounted on the other ends thereof, said wiper arms in turn carrying wipers 19 in the conventional manner. It will readily be appreciated that whenever wiper motor 12 is placed in operation, the motion produced by the wiper motor is transmitted to wipers 19 through the above described linkage for causing said wipers to oscillate back and forth across the windshield to clear moisture therefrom.

In order to provide self-lubricating low-friction action between link elements 15 and 16, any of the various ball joint embodiments of the present invention may be used. In FIG. 2, a basic embodiment of the present invention is shown. Elongated link element 15 has a perforation 20 therein for receiving the shoulder 21 of bearing ring 22 by a press fit to thereby locate said bearing with respect to link 15. Shouldered bearing ring, or bearing element, 22 may be fabricated from powdered bronze by a sintering operation to thereby retain lubricant. A ball stud 23 has a partially spherical section 24 formed integrally therewith having an outer convex spherical surface 25 which is received in complementary mating relationship in concave spherical surface 26 of bearing element 22. During assembly, a cap plate 27 is located over spherical ball section 24 (FIG. 3) and this action results in aligning apertures 28 in the cap plate with apertures 29 in the elongated link element 15 to thereby permit the insertion of rivets 30 through said aligned apertures for securing the ball and socket assembly by peening the ends 31 or rivets 30. The ball stud 23 has a shoulder 32 thereon and a stud portion 33 which is received in aperture 34 of lever or link element 16 (FIG. 3), the end of stud portion 33 being peened at 35 to rigidly secure said ball stud 23 on link element 16 by virtue of the cooperating action between shoulder 32 and peened-over portion 35.

Ball stud 23 may be fabricated from steel by a screw machine operation. Cap plate 27 in the embodiment of FIGS. 2 and 3 is preferably made of brass thereby providing dissimilar surface type of contact between the ball and the socket of the cap plate. In order to ensure long life lubrication of the ball and socket joint of FIGS. 2 and 3, a quantity of grease 36 is placed in the chamber defined by the cut-away section 37 of ball 24 and the socket 38 of cap plate 27 during the assembly operation. This lubricant tends to coat the surface between ball section 24 and socket 38. The porous bearing element 22, prior to installation, is impregnated with lubricant.

There is a structural arrangement in the foregoing assembly for stabilizing it, in addition to the press fit between bearing element shoulder 21 and perforation 20. The stabilizing relationship is due to the interlocking of peripheral portion 39 of bearing ring element 22 with a shoulder 40 in the cap plate 27. The foregoing interlocking relationship 39-40 tends to stabilize bearing element 22 against lateral movement. Furthermore, the laterally extending portion 41 of the bearing element 22 is sandwiched between portion 42 of cap plate 27 and the marginal portion 43 of elongated link element 15 proximate perforation 20. Thus the bearing element 22 is stabilized by three interlocking fits, namely, the press fit between shoulder 21 and perforation 20, the sandwiching of laterally extending portion 22 of the bearing 21 between portion 42 of cap plate 27 and portion 43 of elongated link 15, and the engagement of peripheral portion 39 of bearing element 22 and shoulder portion 40 of cap plate 27.

Figure 4:
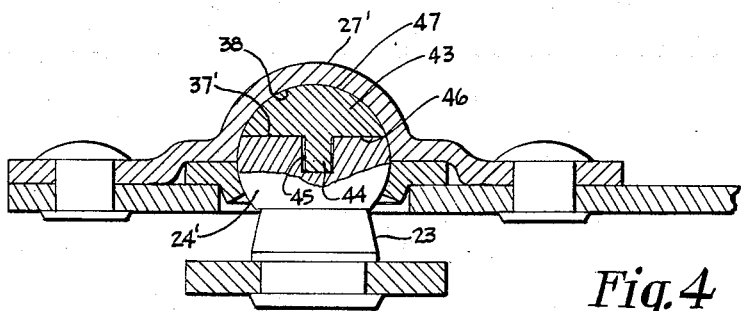
FIG. 4 is a cross sectional view of a modified embodiment of the present invention wherein ball element includes a lubricant-carrying section.

In FIG. 4, an alternate embodiment of the present invention is shown. All elements of this embodiment are similar to the elements described above with respect to FIGS. 2 and 3 except as hereafter noted. In the embodiment of FIG. 4, a ball insert section 43 of sintered powdered bronze has a stem 44 which fits into a drilled opening 45 in ball section 24' of ball stud 23. Furthermore, insert section 43 has a surface 46 which matches the cut-away surface 37' of ball stud 23 and rests thereon. The outer surface 47 of insert section 43 is of spherical convex configuration for mating engagement with concave spherical surface 38 of cap plate 27'. Porous bronze insert section 43 is impregnated with lubricant prior to assembly and thus provides lifetime lubrication at the bearing surface 38-47. Cap plate 27' may be fabricated from steel in this embodiment. Except for the above enumerated features, the remainder of the ball and socket joint may be the same as set forth relative to the embodiment of FIGS. 2 and 3.

A modification of the embodiment of FIG. 4 is shown in FIG. 5. The embodiment of FIG. 5 is the same in all respects as the embodiment of FIG. 4 except that ball section 24" has a peripheral groove 48 therein for the purpose of preventing contact with the upper portion of ball section 24" and the concave spherical surface 38 of cap plate 27'. This groove prevents steel to steel contact between ball section 24" and concave surface 38.

Figure 7:
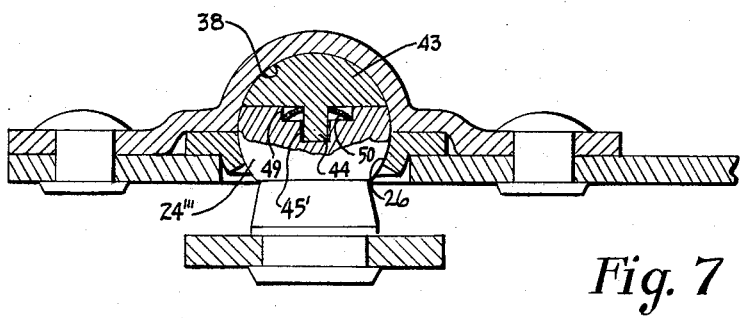
FIG. 7 is another and preferred embodiment of the present invention similar to FIG. 3, but having a spring inserted between the insert section of the ball and the major portion of the ball element.

In FIG. 7 a preferred embodiment of the present invention is shown. This embodiment is similar in all respects to the embodiment of FIG. 4 except as hereafter noted. The ball section 24''', in addition to having a drilled hole 45' therein for receiving stem 44 of ball insert section 43, also has a counterbore 49 which receives a spring 50.

Spring 50 provides a biasing or expanding force tending to move ball section 24''' and insert section 43 apart. Thus as wear is experienced between the composite ball section 43–24''' and its mating socket 38–26, the spring 50 will tend to separate the ball sections and maintain them in firm engagement with the socket in which they are located. This results in the taking up of play which is incidental to any development of wear to thereby maintain the ball and socket and socket joint tight throughout the life of the installation, thereby minimizing any noise which may result from such possibility of wear. Except for the foregoing differences, the embodiment of FIG. 7 possesses the same construction as noted above with respect to the embodiment of FIG. 4.

Figure 6:
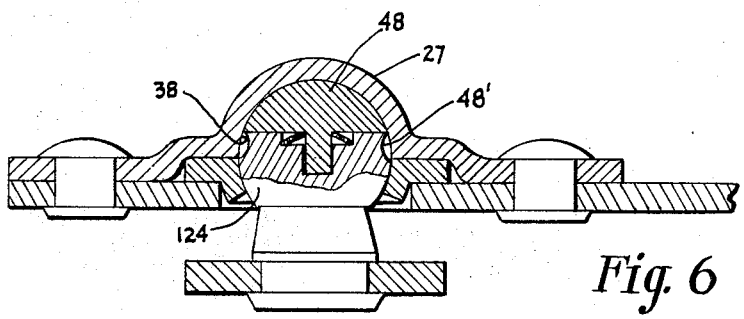
FIG. 6 is another modified form of the present invention similar to FIG. 5, but having a spring interposed between the main portion of the ball element and the insert portion thereof.

A modified embodiment of FIG. 7 is disclosed in FIG. 6 wherein the ball section 124 has the upper peripheral surface thereof cut-away at 48' to prevent steel to steel contact between ball 124 and the concave surface 38 of cap plate 27. However, the embodiment of FIG. 6 functions in the same manner as the embodiment of FIG. 7 to provide an expanding relationship between the sections 124 and 48' of the ball sections to maintain the relatively movable parts of the ball and socket joint in firm engagement throughout the life of the linkage.

Summarizing FIGS. 4–7, it is to be noted that there is a dual sectioned relationship of the ball and socket joint in that the composite ball consists of two sections, namely, a ball section which is integral with the ball stud and an insert section which is mounted on the ball section. The insert section is fabricated from porous bronze, or may be fabricated from any other suitable porous bearing material capable of retaining lubricant. Furthermore, the socket consists of two sections, namely, an insert bearing section fabricated of porous bronze or any other suitable material capable of retaining lubricant and a cap plate socket section. The fact that dissimilar bearing materials exist between the relatively movable parts of the composite ball section provides optimum low-friction operation which is enhanced by the lubricant storing qualities of the porous bearing elements. It is also to be noted that there is a slight clearance between the stem 44 of insert element 43 and drilled hole 45 of ball section 24' in the embodiment of FIG. 4, and like clearances in the embodiments of FIG. 5–7, to obviate any tendency for the stem to fracture if the ball insert portion 43 should be subjected to lateral forces.

While preferred embodiments of the present invention have been disclosed, it is to be understood that the present invention is not to be limited thereto, but may be otherwise embodied within the scope of the following claims.

What is claimed is:

1. In a windshield wiper linkage construction comprising a link element having a perforation and a lever element connected thereto for articulated movement; the combination comprising a ball and socket type joint connecting said link and lever including an internal socket bearing assembly and a ball stud, said socket bearing assembly comprising a porous lubricant-retaining socket member having a portion thereof disposed in said perforation for providing a mating fit therewith, said portion having an opening and a cap plate including a concave internal bearing surface disposed adjacent said socket member to form a concave spherical internal bearing surface for receiving said ball stud, said socket member and said cap plate having mating annular portions for maintaining said socket element and cap plate in alignment, said ball stud comprising a stud portion extending through said opening and adapted to be secured to said lever, a first partial spherical section disposed in said socket member and extending into said concave internal surface and a second partial spherical section mating with said first partial spherical section to form a spherical ball stud, said second section engaging said concave internal bearing surface of said cap plate and being of porous lubricant-retaining material.

2. In a windshield wiper linkage construction comprising a link element having a perforation and a lever element connected thereto for articulated movement; the combination comprising a ball and socket type joint connecting said link and lever inlcuding an internal socket bearing assembly and a ball stud, said socket bearing assembly comprising a porous lubricant-retaining socket member having a portion thereof disposed in said perforation for providing a mating fit therewith, said portion having an opening and a cap plate including a concave internal bearing surface disposed adjacent said socket member to form a concave spherical internal bearing surface for receiving said ball stud, said socket member and said cap plate having mating annular portions for maintaining said socket element and cap plate in alignment, said ball stud comprising a stud portion extending through said opening and adapted to be secured to said lever, a first partial spherical section disposed in said socket member and extending into said concave internal surface and a second partial spherical section mating with said first partial spherical section to form a spherical ball stud, said second section engaging said concave internal bearing surface of said cap plate and being of porous lubricant-retaining material and means disposed intermediate said first and second partial spherical sections for biasing said spherical sections into engagement, respectively, with said internal bearing surface.

3. In a windshield wiper linkage construction comprising a link element having a perforation and a lever element connected thereto for articulated movement; the combination comprising a ball and socket type joint connecting said link and lever including an internal socket bearing assembly and a ball stud, said socket bearing assembly comprising a porous lubricant-retaining socket member having a portion thereof disposed in said perforation for providing a mating fit therewith, said portion having an opening and a cap plate including a concave internal bearing surface disposed adjacent said socket member to form a concave spherical internal bearing surface for receiving said ball stud, said socket member and said cap plate having mating annular portions for maintaining said socket element and cap plate in alignment, said ball stud comprising a stud portion extending through said opening and adapted to be secured to said lever, a first partial spherical section disposed in said socket member and extending into said concave internal surface and a second partial spherical section mating with said first partial spherical section to form a spherical ball stud, said second section engaging said concave internal bearing surface of said cap plate and being of porous lubricant-retaining material, and a peripheral recess adjacent the end of said first partial spherical section extending in width at least to said socket member.

4. In a windshield wiper linkage construction comprising a link element having a perforation and a lever element connected thereto for articulated movement; the combination comprising a ball and socket type joint connecting said link and lever including an internal socket bearing assembly and a ball stud, said socket bearing assembly comprising a porous lubricant-retaining socket member having a portion thereof disposed in said perforation for providing a mating fit therewith, said portion having an opening and a cap plate including a concave internal bearing surface disposed adjacent said socket member to form a concave spherical internal bearing surface for receiving said ball stud, said socket member and said cap plate having mating annular portions for maintaining said socket element and cap plate in alignment, said ball stud comprising a stud portion extending through said opening and adapted to be secured to said lever, a first partial spherical section disposed in said socket member and extending into said concave internal surface and a second partial spherical section mating with said first partial spherical section to form a spherical ball stud, said second section engaging said concave internal bearing surface of said cap plate and being of porous lubricant-retaining material, and a peripheral recess adjacent the end of said first partial spherical section extending in width at least to said socket member and means disposed intermediate said first and second partial spherical sections for biasing said spherical sections into engagement, respectively, with said internal bearing surface.

References Cited by the Examiner

UNITED STATES PATENTS

| | | | |
|---|---|---|---|
| 1,889,297 | 11/32 | Russel | 287—87 X |
| 2,216,987 | 10/40 | Rose | 287—87 X |
| 2,427,449 | 9/47 | Dunn | 287—87 |
| 2,678,841 | 5/54 | Klages. | |
| 2,733,085 | 1/56 | Latzen | 287—87 |
| 2,767,004 | 10/56 | Ashworth et al. | |
| 2,857,190 | 10/58 | Moskovitz | 287—87 |
| 2,883,221 | 4/59 | Latzen | 287—87 |
| 2,913,268 | 11/59 | Booth. | |
| 2,924,469 | 2/60 | Moskovitz. | |
| 2,933,309 | 4/60 | Heiss | 287—87 X |
| 2,952,029 | 9/60 | Lindsay | 15—250.27 |
| 2,976,555 | 3/61 | Bartoo | 15—25.27 |
| 2,999,708 | 9/61 | Dudash | 287—87 |
| 3,011,811 | 12/61 | Haller | 287—87 |

FOREIGN PATENTS

| | | |
|---|---|---|
| 1,043,832 | 11/53 | France. |
| 769,158 | 2/57 | Great Britain. |
| 797,545 | 7/58 | Great Britain. |

CARL W. TOMLIN, *Primary Examiner.*

BROUGHTON G. DURHAM, *Examiner.*

UNITED STATES PATENT OFFICE
CERTIFICATE OF CORRECTION

Patent No. 3,216,753 November 9, 1965

John R. Oishei

It is hereby certified that error appears in the above numbered patent requiring correction and that the said Letters Patent should read as corrected below.

Column 4, line 5, for "or" read -- of --.

Signed and sealed this 9th day of August 1966.

(SEAL)
Attest:

ERNEST W. SWIDER
Attesting Officer

EDWARD J. BRENNER
Commissioner of Patents